US012768389B2

(12) United States Patent
Dissing

(10) Patent No.: US 12,768,389 B2
(45) Date of Patent: Oct. 20, 2026

(54) SCREW, ITS USE AND A METHOD FOR FASTENING WORKPIECES AND DECKING A TERRACE

(71) Applicant: DISSING A/S, Skanderborg (DK)

(72) Inventor: Claus Hornstrup Dissing, Ry (DK)

(73) Assignee: DISSING A/S, Skanderborg (DK)

( * ) Notice: Subject to any disclaimer, the term of this patent is extended or adjusted under 35 U.S.C. 154(b) by 330 days.

(21) Appl. No.: 18/706,819

(22) PCT Filed: Nov. 1, 2022

(86) PCT No.: PCT/DK2022/050229
§ 371 (c)(1),
(2) Date: May 2, 2024

(87) PCT Pub. No.: WO2023/078518
PCT Pub. Date: May 11, 2023

(65) Prior Publication Data

US 2026/0153116 A1 Jun. 4, 2026

Related U.S. Application Data

(60) Provisional application No. 63/274,603, filed on Nov. 2, 2021.

(30) Foreign Application Priority Data

Nov. 2, 2021 (DK) ........................... PA 2021 70536
Nov. 2, 2021 (DK) ........................... PA 2021 70537

(51) Int. Cl.
*F16B 25/10* (2006.01)
*F16B 5/02* (2006.01)
*F16B 25/00* (2006.01)

(52) U.S. Cl.
CPC ........ *F16B 25/0084* (2013.01); *F16B 5/0275* (2013.01); *F16B 25/0015* (2013.01); *F16B 25/0063* (2013.01); *F16B 25/103* (2013.01)

(58) Field of Classification Search
CPC ................ F16B 25/0084; F16B 5/0275; F16B 25/0015; F16B 25/0063; F16B 25/103
See application file for complete search history.

(56) References Cited

U.S. PATENT DOCUMENTS 4,147,088 A 4/1979 Whittaker, Jr.
4,568,229 A 2/1986 Hulsey
(Continued)

FOREIGN PATENT DOCUMENTS

DE 1475049 A1 5/1969
DE 2913482 A1 10/1980
(Continued)

OTHER PUBLICATIONS

International Search Report for PCT Patent App. No. PCT/DK2022/050229 (Jan. 27, 2023).
(Continued)

*Primary Examiner* — Amy J. Sterling
(74) *Attorney, Agent, or Firm* — Cermak & McGowan LLP; Malcolm K. McGowan

(57) ABSTRACT

For fastening panels (18) made of wood-plastic composites onto an underlying wooden support structure, a screw (1) is provided with a drill point (3) having an eccentric tip (7).

16 Claims, 6 Drawing Sheets

(56) References Cited

U.S. PATENT DOCUMENTS

| | | | | |
|---|---|---|---|---|
| 4,789,288 | A | 12/1988 | Peterson | |
| 7,214,019 | B2 | 5/2007 | Palm | |
| 8,926,249 | B2 | 1/2015 | Lin | |
| 9,103,364 | B2 | 8/2015 | Lin | |
| 11,391,314 | B2 * | 7/2022 | Chen | F16B 25/0063 |
| 2004/0141827 | A1 | 7/2004 | Dicke | |
| 2009/0010734 | A1 | 1/2009 | Lin | |
| 2009/0097942 | A1 | 4/2009 | Weiss et al. | |
| 2017/0227039 | A1 * | 8/2017 | Shih | F16B 25/103 |
| 2018/0100534 | A1 * | 4/2018 | Dill | F16B 25/0084 |
| 2019/0093691 | A1 * | 3/2019 | Ruhmann | F16B 25/0015 |

FOREIGN PATENT DOCUMENTS

| | | | |
|---|---|---|---|
| DE | 102011005862 | A1 | 9/2012 |
| EP | 3569877 | A1 | 11/2019 |
| KR | 10-2020-0100963 | A | 8/2020 |
| WO | WO2011/154279 | A1 | 12/2011 |

OTHER PUBLICATIONS

Search Report from Danish Patent App. No. PA 2021 70536 (Apr. 5, 2022).

Search Report from Danish Patent App. No. PA 2021-70537 (Apr. 5, 2022).

Written Opinion of the International Searching Authority for PCT Patent App. No. PCT/DK2022/050229 (Jan. 27, 2023).

Written Opinion of the International Preliminary Examining Authority for PCT Patent App. No. PCT/DK2022/050229 (Sep. 29, 2023) with concurrently issued annex.

Search Report from Taiwanese Patent App. No. 111141689 dated Dec. 9, 2025.

* cited by examiner

SCREW, ITS USE AND A METHOD FOR FASTENING WORKPIECES AND DECKING A TERRACE

CROSS-REFERENCE TO RELATED APPLICATIONS

This application claims priority from PCT/DK2022/050229, filed 1 Nov. 2022, which claims priority from U.S. Application 63/274,603, filed 2 Nov. 2021; from Danish Application PA 2021 70536, filed 2 Nov. 2021; and from Danish Application PA 2021 70537, filed 2 Nov. 2021. The contents of these priority applications are incorporated herein by reference in their entirety.

FIELD OF THE INVENTION

The present invention relates to a screw, its use, and a method for fastening plastic or wood plastic composite workpieces, especially panels, to a support, in particular wooden support structure. The present invention relates also a method for decking a terrace or balcony by panels. In particular, it relates to a screw, its use and method according to the independent claims.

BACKGROUND OF THE INVENTION

For insulation panels, where an insulation material is located between two metal sheets, it is customary to provide screws with a drill point in order to drill the screw through the metal layers before it grips into the underlying roof or wall structure, typical wooden structure.

An example of a screw for such insulation panels is disclosed in U.S. Pat. No. 4,568,229. The screw comprises a largely conical drill point which is centred about the central axis of the screw. The drill point comprises two sets of cutting edges. The foremost, primary set of cutting edges meet in a foremost tip that is slightly off-centred from the central axis. The disclosure reads that the screw drills faster through metal sheets, due to the foremost tip of the drill point being slightly off-centred. During screwing, the eccentric tip enters the metal first, after which the remaining conical drill point will work its way through the metal by first primary and subsequently the secondary cutting edges reaming their way through the metal sheet.

German publication DE2913482 discloses a different screw for metal sheets, where the foremost tip portion is slightly off-centred in order to prevent the screw from moving away from the desired hole location.

U.S. Pat. No. 7,214,019 discloses a self-tapping screw with an eccentric bore tip. When the screw has been screwed through a panel of a brittle material and reaches the metallic under-layer, the eccentric tip leads to a wobbling of the screw before the screw is drilled through the metal layer on the opposite side of the brittle material. This wobbling creates a broad hole in the brittle material panel, so that the panel can move around the screw without breaking when temperatures change.

Screws that are for drilling through metal sheets for various purposes have not been proposed for screwing into wood because a centered drill point has proven to be very efficient for wood. Screws with centered tips are also typically used for polymer panels, even tough materials, as described in the following.

Durable polymer panels are often used for outdoor constructions. In particular, due to material toughness, weatherability, and longevity, panels made from wood-plastic composites, WPC, are popular for outdoor flooring. Typically, the panels made from such material are fastened by screws to a support structure of wooden bars. The screws have to be constructed such that they maintain a good grip in the wooden support. A way to provide long term stability of screws can be achieved by drilling holes through the panels and then insert the screw through the holes and into the underlying wood. However, this requires two working steps, which is not desired for quick construction. In order to reduce time and effort when laying down the panels, screws are desired which have a drill point at the front end so that they can be drilled through the panel and then screwed into the underlying wooden support structure. However, drilling a screw through the tough WPC material is often difficult, as screws get heated. Additionally, pressing material aside when screwing may result in lifting of the material around the drilled hole. Accordingly, screw-drilling through WPC panels has turned out to be a challenge, and many screws do not fulfil the purpose satisfactory.

In order to overcome some of the challenges with WPC panels, screws have been disclosed in the prior art that deviate from more traditional types of screws. Some of such examples are disclosed in the patents U.S. Pat. Nos. 8,926,249 and 9,103,364, where screws have a triangular cross-sectional shape. Although, fulfilling the needs, such screws are complex and expensive in fabrication.

Seeing that the number of screws for fastening WPC flooring is large, there is a need for a drilling screw that functions well but can be provided at lower cost. Accordingly, there is a general need for more cost-effective screws that can be drilled through WPC panels and fasten the panels in a satisfactory way to the underlying wooden support structure, in particular without elevations around the screw hole when the screw head is countersunk into the material.

DESCRIPTION/SUMMARY OF THE INVENTION

It is therefore an objective of the invention to provide an improvement in the art. In particular, it is an objective to provide an improved screw and method for fastening wood-plastic-composite, WPC, panels to a support structure made of wood. It is a further objective to provide an improved method for decking a terrace or balcony by fastening plastic panels or plastic composite panels. It is a further objective to provide a screw that is simple to produce and which involves low production costs. These objectives are achieved by a screw and method as described in the following description and in the claims. In particular, for drilling though wood-plastic composites, and for drilling through decking panels made of plastic with or without reinforcing material in a plastic matrix, a screw is provided with a drill point having an eccentric tip. Further advantages will appear from the following description.

Primarily, the screw presented herein is configured for drilling and screwing into and through a workpiece of a wood plastic composite, WPC, which puts substantial requirements to the drill-ability of the drill point at the front end of the screw. WPC panels contain wood fibers as a reinforcing material in a plastic matrix.

This requires, on the one hand a good penetration capacity by the tip of the screw through the polymer matrix, despite substantial thickness, a subsequent good grip and screwing capability into the underlying wooden structure, as well as proper countersinking capabilities in the fibrous composite.

As will appear from the following, the screw is particularly useful for decking a terrace or balcony by plastic panels, especially plastic composite panels on a support structure, typically wooden support structure.

However, although, the screw is particularly useful for outdoor WPC flooring, the screw is universal and can also be used for vertically oriented or inclined WPC panels. Examples are facade coverings.

Similar to other prior art screws, the screw has a central longitudinal axis and comprises a stem, for example circular cylindrical stem, with a screw head at a first end and a drill point at an opposite second end and a first thread around the stem, wherein the first thread is adjacent to the drill point and configured for screwing into and through the workpiece and a potential underlying support structure after pre-drilling with the drill point. The drill point comprises a foremost tip for initial workpiece contact during start of drilling and screwing into the workpiece.

However, in contrast to prior art screws used for WPC panels, the tip is eccentrically displaced from the central axis. As already discussed above, eccentric drill points have not yet been used for screwing through WPC panels for fastening such panels, especially outdoor panels for decking a terrace, to an underlying support structure made of wood. In experiments, however, screws with eccentric tip have proven particularly advantageous for drilling into WPC panels.

In practice, a support structure made of wood, is provided, and the panel is placed against the support structure. A screw provided with a length larger than the thickness of the panel and drilled through the panel with a portion of the first thread into the underlying wood structure and the panel fastened onto the support structure by the first thread, while the screw head pulls the panel towards the support structure. As an option, the screw is advanced until the head is countersunk in the panel.

In practical embodiments, the drill point comprises a cutting edge extending from the tip to the stem and a cutting face extending from the cutting edge inwards towards an inner part of the drill point. The angle of the cutting face can be varied, but extending lateral or approximately lateral from the cutting edge has been found useful. Thus, optionally, the cutting face extends from the cutting edge inwards towards the centre of the screw.

For example, the cutting face is planar. In useful embodiment, the plane cutting face is parallel to the central axis. Optionally, the cutting face extends laterally from the cutting edge radially inwards towards the central axis so as to follow a plane parallel to the central axis and containing the central axis.

In some embodiments, the cutting edge extends to the central axis, while in others, it extends towards the central axis but does not reach the central axis. In even further embodiment, it crosses the central axis and extends to the opposite side of the central axis.

Although, a planar cutting face has been found useful, a deviation from a planar face, for example slightly bent, is also possible to use.

The cutting face is forming a first side of a longitudinal slot in the drill point and is configured for working the workpiece during drilling and screwing of the screw in the workpiece.

A curved outer surface is tapering from the stem to the tip, typically smoothly tapering. For example, the outer surface is formed as a part of an oblique circular cone. Alternatively, the curved outer surface is tapering along concave or convex curves from the stem to the foremost tip.

Advantageously, the convex tapering surface extends over an angle of no less than 225 degrees and no more than 330 degrees, for example no less than 240 degrees and/or no more than 315 degrees, about the central axis as measured from the cutting edge. In experiments, an angle within this range has been found useful.

A second face is extending from the curved outer surface to the cutting face and forming a second side of the slot. Accordingly, the drill point is formed by the longitudinal slot and the convex tapering smoothly curved surface, for example circular oblique conical surface, where the curve bends about the central axis from the cutting edge and to the second face of the longitudinal slot. The term longitudinal slot is here used because the slot extends to the tip in the longitudinal direction of the screw.

Optionally, the transition between the second face and the convex tapering curved surface, for example circular oblique conical surface, is smooth. Alternatively, an edge is provided as a transition between the second face and the tapering curved surface.

It has turned out that the screw very efficiently drills into WPC panels. In particular, especially in comparison with the prior art, the drill point is simple and only needs a single tip and a single cutting face. Experiments have even shown that a single tip is advantageous relatively to those screws that have two tips of a pair of identical cutting edges at the front, as symmetry in the drill point increases the risk of plastic being caught at the tip and melting due to friction, which takes away the drilling efficacy.

In embodiments especially useful for WPC panels, the screw comprises a second thread between the first thread and the screw head, the second thread having a helical direction opposite to the first thread. Whereas the first thread is used for screwing the screw into and through the workpiece, such as panel, this second thread is configured and used for pulling material from the drilled hole, including reinforcing fibers, deeper into the workpiece during screwing of the screw through the workpiece. Advantageously, the second thread has an outer diameter larger than the outer diameter of the first thread.

In those cases where the head should be countersunk, the material pressed into the workpiece has to be accumulated in the hole, as it otherwise is pressed to the side and creates unwanted elevations around the screw head. To provide such space inside the hole for accommodating the material, the stem optionally comprises a region without thread between the head and the second thread, where the region has a diameter smaller than the outer diameter of the second thread. Typically, the region has a length not less than a pitch of the second thread and/or the height of the head. As the second thread is milling a hole larger than the stem underneath the head, the material pressed into the hole by the head due to the countersinking of the head is accumulated in this space.

Optionally, the head is provided with a sharp circumferential edge along the periphery on the underside of the head in order for the head to cut its way into the material and, thus, smoothly enter the workpiece. The cutting edge also cuts possible wood fibres around the head so that fringing around the head in the countersunk hole is prevented. In order to fasten a panel made of wood plastic composite onto a supporting wood structure, the screw must have a length larger than the thickness of the panel so that it can be drilled entirely through the panel with a portion of the first thread entering the underlying wood structure, so as to fasten the panel onto the support structure by the first thread.

In particular for panels used as deck for terraces and balconies, typical dimensions apply. Thicknesses are typically in the range of 5-50 mm. In the USA, a preferred thickness is 1 inch=25.4 mm. Widths are typically in the range of 100-305 mm. In the USA, a preferred width is 6 inch=152 mm. In the USA, typical standard lengths for panels for decking are 12', 16', 20' (3.7 m; 4.9 m; 6.1 m).

For reinforced panels, the plastic concentration by weight is typically in the range of 25-60%, but often in the range of 40-50%. Typically, additives, such as colorants and lubricants make up 5-10% by weight. Accordingly, a typical weight concentration of the reinforcing fibrous filler, especially wood fibers, is in the range of 40-65%.

SHORT DESCRIPTION OF THE DRAWINGS

The invention will be explained in more detail with reference to the drawing, wherein FIG. 1 illustrates an embodiment of a screw for WPC panels;

DETAILED DESCRIPTION/PREFERRED EMBODIMENT

Figure 1:
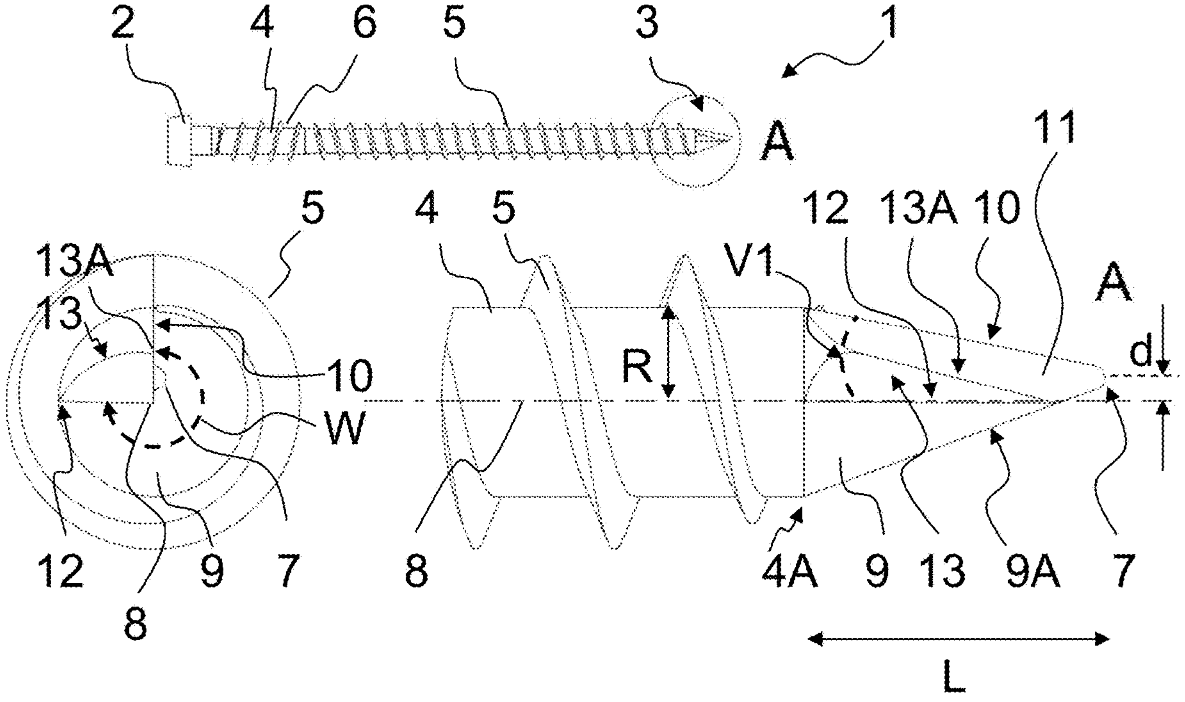

FIG. 1 illustrates a screw 1 that is especially useful for drilling through a WPC panel and for fastening it to a wooden support structure.

The screw 1 comprises a stem 4 with a screw head 2 at a first end of the stem 4 and a drill point 3 at the opposite, second end. A first thread 5 is provided around the stem 4 adjacent to the drill point 3 and configured for screwing into wood. The screw 1 also comprises a second thread 6, the helical direction of which is opposite to the first thread 5. During screwing of the screw 1 into and through the panel and into the underlying wooden support structure, the second thread 6 is pulling panel material deeper into the hole so that the entrance of the drilled hole is cleaned from chips from the screwing and drilling action.

Figure 2:
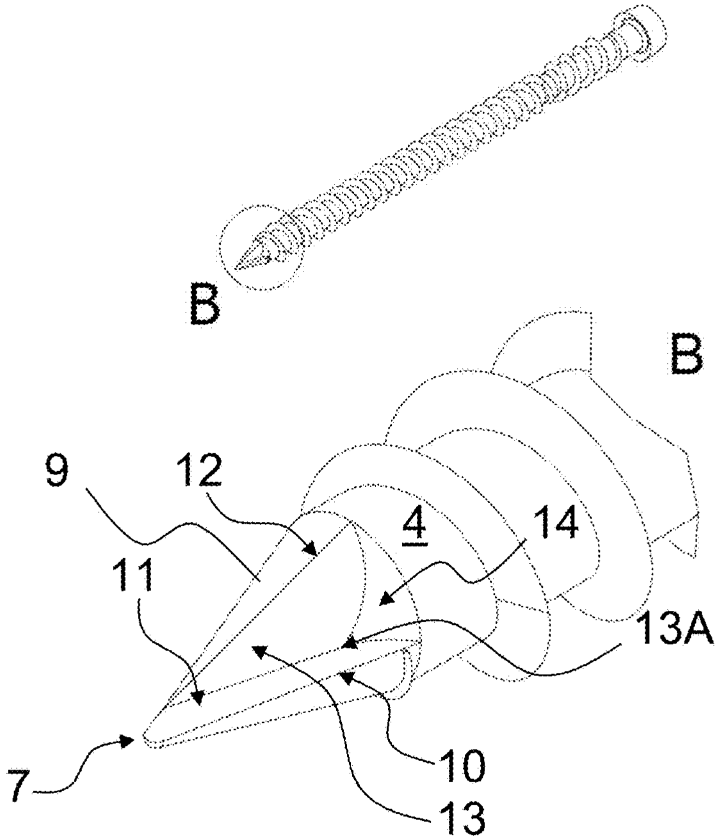
FIG. 2 shows the drill point in more detail
Figure 3A:
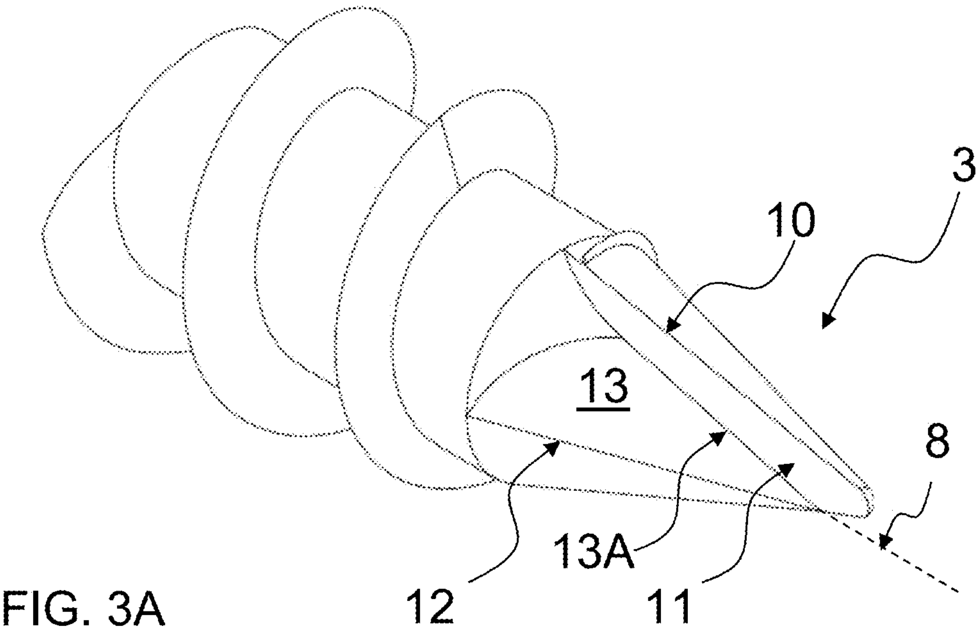
FIG. 3 shows the drill point in different perspectives in FIGS. 3A and 3B, as well as indications for angles for different side views in FIGS. 3C and 3D.
Figure 3B:
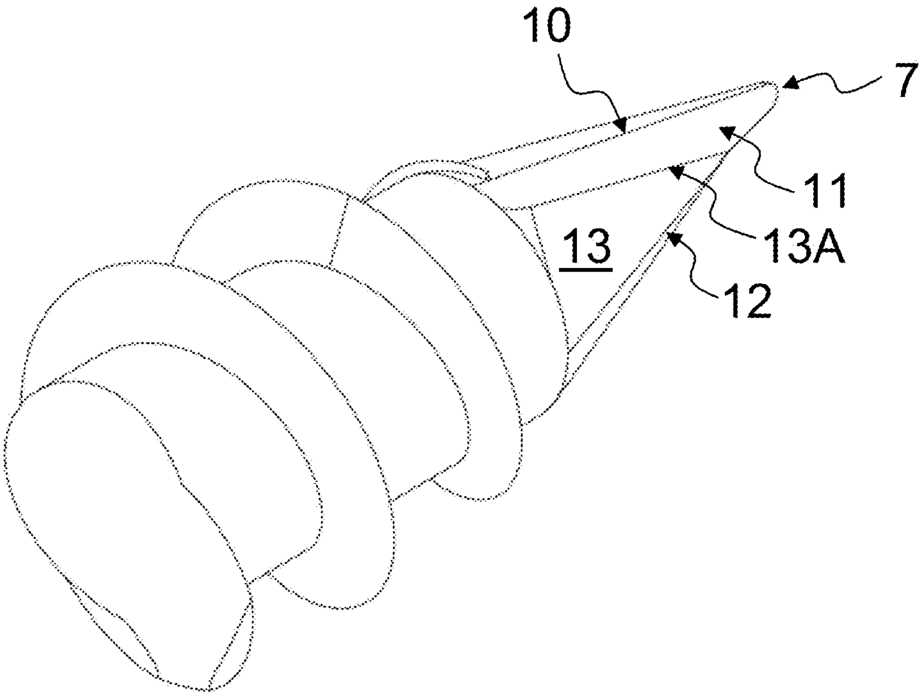

In FIG. 1 in a side view of the enlarged section A, and in FIGS. 2 and 3A and 3B in perspective views of the similar enlarged section B, the drill point 3 is shown in further detail. The drill point 3 comprises a tip 7 at the foremost end of the drill point 3. The tip 7 is offset a distance d from the central axis 8 of the screw 1. The offset d is measured from the central axis 8 to the most forward point of the tip 7, which is typically a bit rounded for reason of production and mechanical stability. The ratio between the distance d and the radius R of the stem 4 is typically in the range of 0.1-0.7. However, the possible range of d/R is as much as 0.1-0.95 or in principle even 0.1-1.0, as the eccentric tip 7 can be flush at the rim of the stem 4.

A cutting edge 10 extends from the stem 4 to the eccentric tip 7. The length of the drill point 3 is measured from the foremost point of the tip 7 to the transition 4A between the stem 4 and the drill point 3. Typically, the length L of the drill point 3 is in the range of 2-5 times the radius R of the stem 4.

A cutting face 11 extends longitudinally along the cutting edge 10 and extends transversely from the cutting edge 10 towards the central axis 8. In the direction towards the central axis 8, the cutting face 11 is delimited by an edge 13A at a second surface 13, which is illustrated as a convex curved transition surface.

In the lower left of FIG. 1, a head-on view of the drill point 3 is seen with the eccentric tip 7. Due to the fact that the tip 7 is off-centred relatively to the central line 8, the drill point 3 is not regularly conical. Instead, the drill point 3 is delimited by a tapering convex surface 9 which is a W=270-degree portion of an oblique circular cone that extends from the cutting edge 10 about the central axis 8 to a second edge 12 of the drill point 3. A second face 13 extends as a convex transition surface from the second edge 12 to the cutting face 11. The second face and the cutting face 11 form a slot 14 in the drill point 3. Accordingly, the drill point, as illustrated, is formed by the tapering convex surface 9 and the slot 14. As an alternative to the second edge 12, the transition between the second face 13 and the curved surface 9 could be smooth.

The fact that the tapering convex surface 9 extends over an angle W=270° about the central axis 8 implies that the slot 14 between the cutting edge 10 and the second edge 12 extends over 360°−W=90°.

In the shown embodiment, the drill point 3 is formed by the convex surface 9, the cutting face 10, and the second face 13 in the form of a convex transition surface. It is put forward that this is a simple construction as compared to prior art, especially when com-paring with the screw in U.S. Pat. No. 4,458,229, in which various cutting surfaces are provided, requiring extensive shaping by various tools.

The angular span W of the oblique conical surface 9 is not necessarily 270 degrees but could vary to a slightly larger or smaller angle, for example in the range of 225 to 315 degrees, such as 240-315 degrees. However, if the angle becomes too large, there is a risk that the material gets accumulated in the slot 14 between the edges 10, 12, and if the angle becomes too small, sufficiently stable drilling is compromised.

Figure 3C:
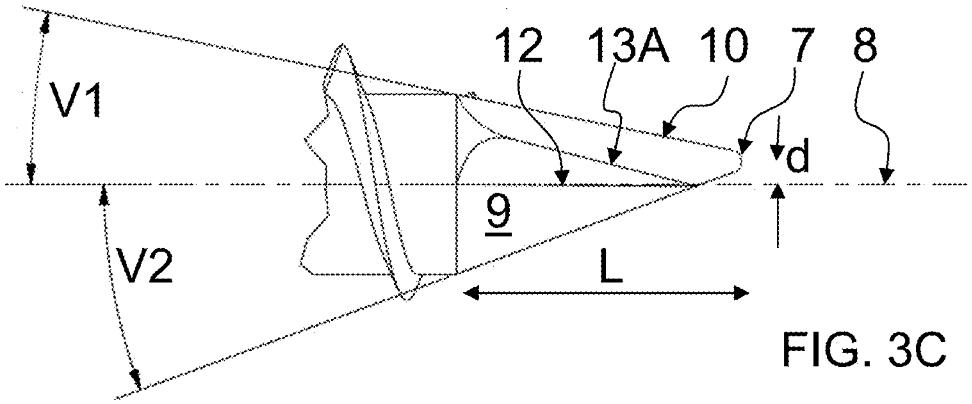

FIG. 3C illustrates a head on view onto the cutting face and indicates the angle V1 between the cutting edge 10 and the central axis 8. The angle V1 between the cutting edge 10 and the central axis 8 is determined by the radius R of the stem, the length L of the drill point 3, and the offset d of the tip 7.

Figure 3D:
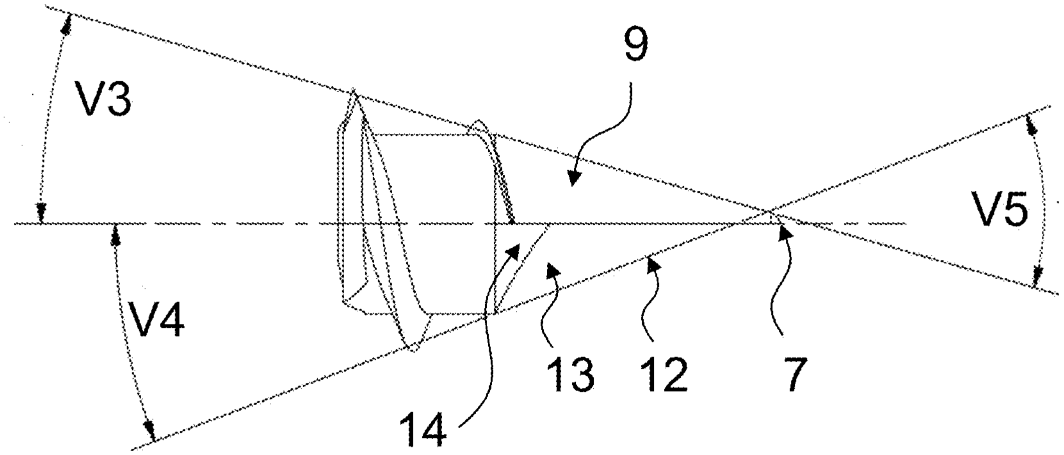

As illustrated in FIG. 3D, which is a tangential view onto the second edge 12, the angle V4 between the second edge 12 and the central axis 8 is larger than V1. Due to the tapering curved surface 9 being an oblique cone and not a regular cone, the angle of the surface with the stem 4, or equivalently with the central axis 8, increases continuously from V1 to V4 and passes V2 and V3, as indicated, when moving from the cutting edge 10 to the second edge 12 in a circle about the central axis 8 and along the curved surface 9. In the shown example, the angles W=270°, V1=10°, and V4=20°.

These angles vary together with the cone angle V5 in accordance with the construction and dimensioning of the drill point 3. A few examples are shown below.

When the screw 1 is rotated about the central axis 8 during screwing, the tip 7 is moving in a circle around the central axis 8. In the initial phase, when the tip 7 is placed on the surface of the panel, the rotation of the tip 7 on a spot leads to a wiggling motion of the screw 1 and the screwing tool, as the tip 7 typically stays on a spot end drills its way through the surface of the panel. This wiggling of the screw gradually decreases, while the drill point 3 works its way through the surface and into the panel. Once, the stem 4 enters the material of the panel, and the first thread 5 gets a grip inside the panel, the wiggling of the screw 1 stops, and the threaded stem 4 guides the screw 1 axially through the material. Due to the further linear forward motion of the screw 1, the tip 7 moves in a circle around the central axis 8 and spirals through the material during advance of the screw 1. The combination of the spiralling tip 7 and the cutting edge 10 results in a working through the material, which is a combination of drilling and milling, which has turned out to be surprisingly efficient.

Figure 10A:
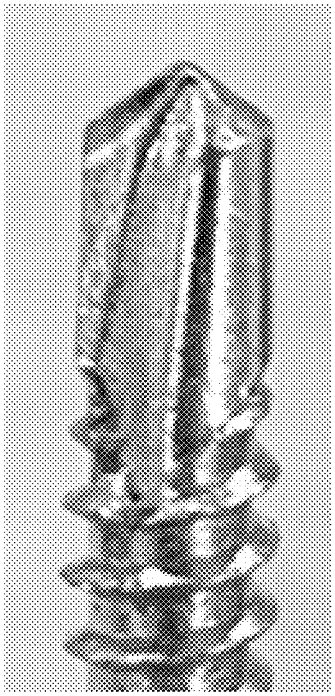
FIG. 10A prior art
FIG. 10 shows a prior art drill point before (FIG. 10A) and after (FIG. 10B) drilling into a WPC panel.
Figure 10B:
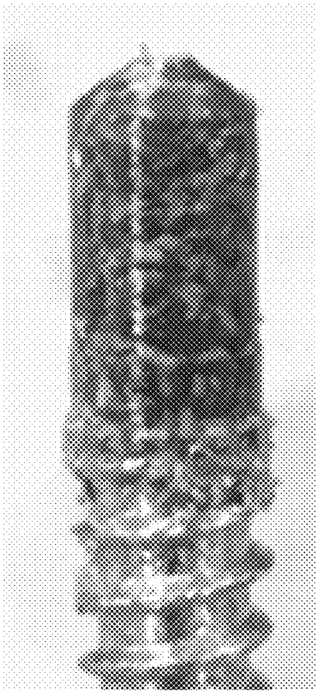
Figure 11A:
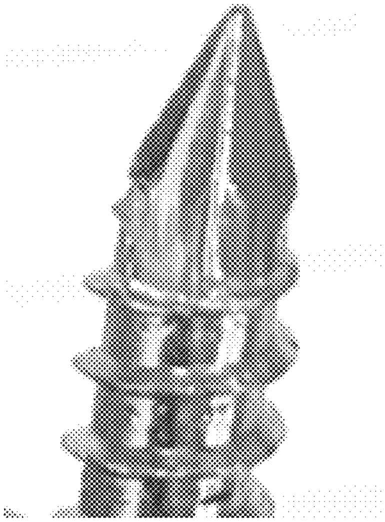
FIG. 11A prior art
FIG. 11 shows another prior art drill point before (FIG. 11A) and after (FIG. 11B) drilling into a WPC panel, as well as a drawing (FIG. 11C) of it.
Figure 11B:
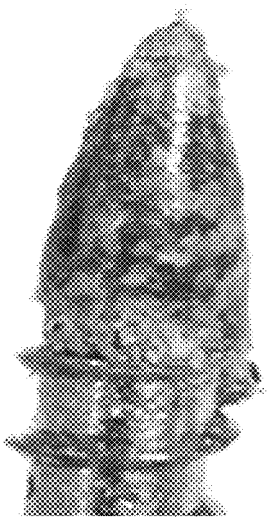
Figure 11C:
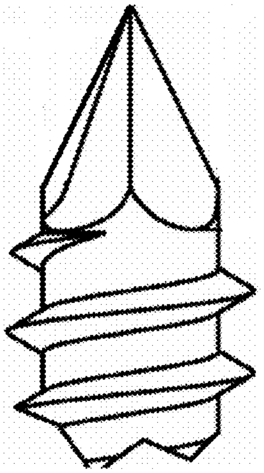

The advantage of the eccentric tip of the drill point 3 is best understood with reference to some preliminary studies that were made with some prior art screws available on the market. FIG. 10A illustrates a photo of a prior art screw with a centred drill point at the end of the screw. This drill point was attempted screwed into a WPC panel, which, however, did not work out. The screw became hot, and the polymer melted around the tip, as shown in the photo of FIG. 10B, and the polymer got attached to the bit to an extent that further drilling was prevented. As shown in the photo of FIG. 11B, a similar failure was observed for a screw of the type shown in FIG. 11A, a drawing of which is shown in FIG. 11C.

In contrast to such prior art screws, the screw with its eccentric tip in the drill point, as described above, drilled efficiently through the WPC panel used in the experiments.

Figure 4:
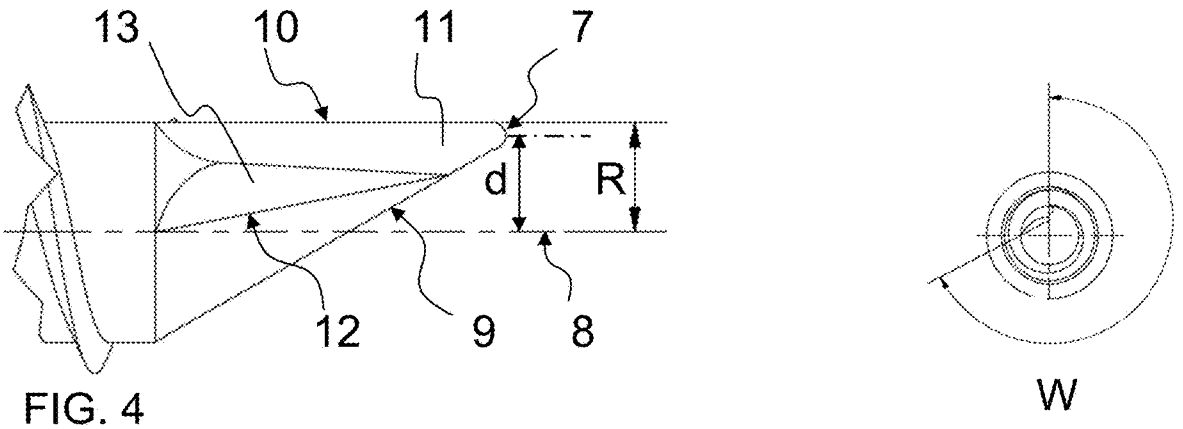
FIG. 4 shows an alternative embodiment.

FIG. 4 illustrates a different embodiment, where the cutting edge 10 is parallel with the central axis 8 and the tip 7 has a distance d from the central axis close to the radius R of the stem 4, for example 0.95·R. In order for the tip 7 to be flush with the stem 4, the tip 7 would have to be asymmetric and sharp-edged. However, in practice, the tip 7 is advantageously slightly rounded for reason of strength and also due to ease of production. In this case, the second edge 12 is not parallel to the central axis 8, as this would result is a very broad cutting face 11, which is typically not desired. In the exemplified embodiment, W=240°.

Figure 5:
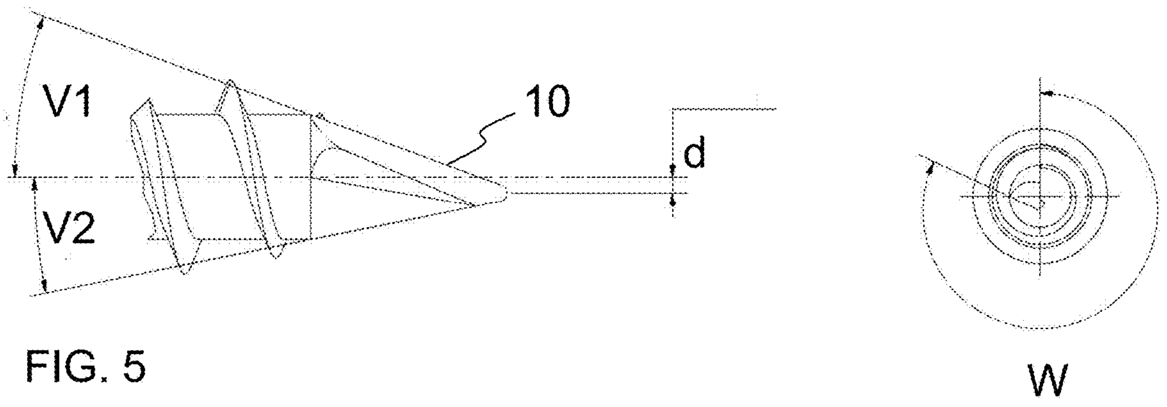
FIG. 5 shows an alternative embodiment.

FIG. 5 illustrates an alternative embodiment in which the angle V1 is larger than in FIG. 3C and the drill point is on the opposite side of the central axis R. For example, in this illustration, V1=20°, V2=11°, and W=295°.

Figure 6A:
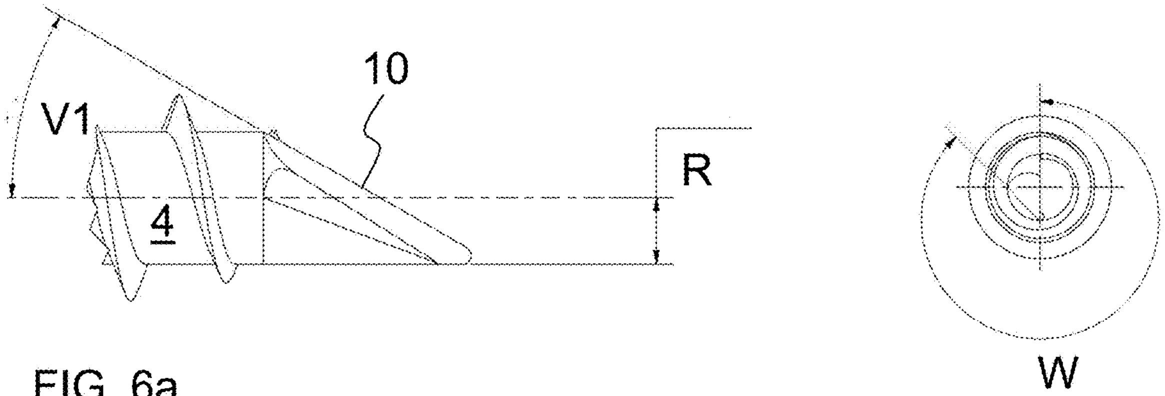
FIG. 6 shows an alternative embodiment.
Figure 6B:
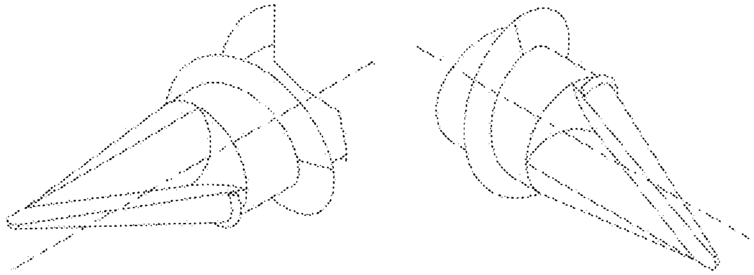

FIG. 6*a* and FIG. 6*b* illustrate a further alternative embodiment in which the angle V1 is larger than in FIG. 3C and the drill point is on the opposite side of the central axis R. The cutting edge 11 extends skew to a line parallel with the stem 4. For example, in this illustration, V1=30°, V2=0°, and W=315°.

Figure 7:
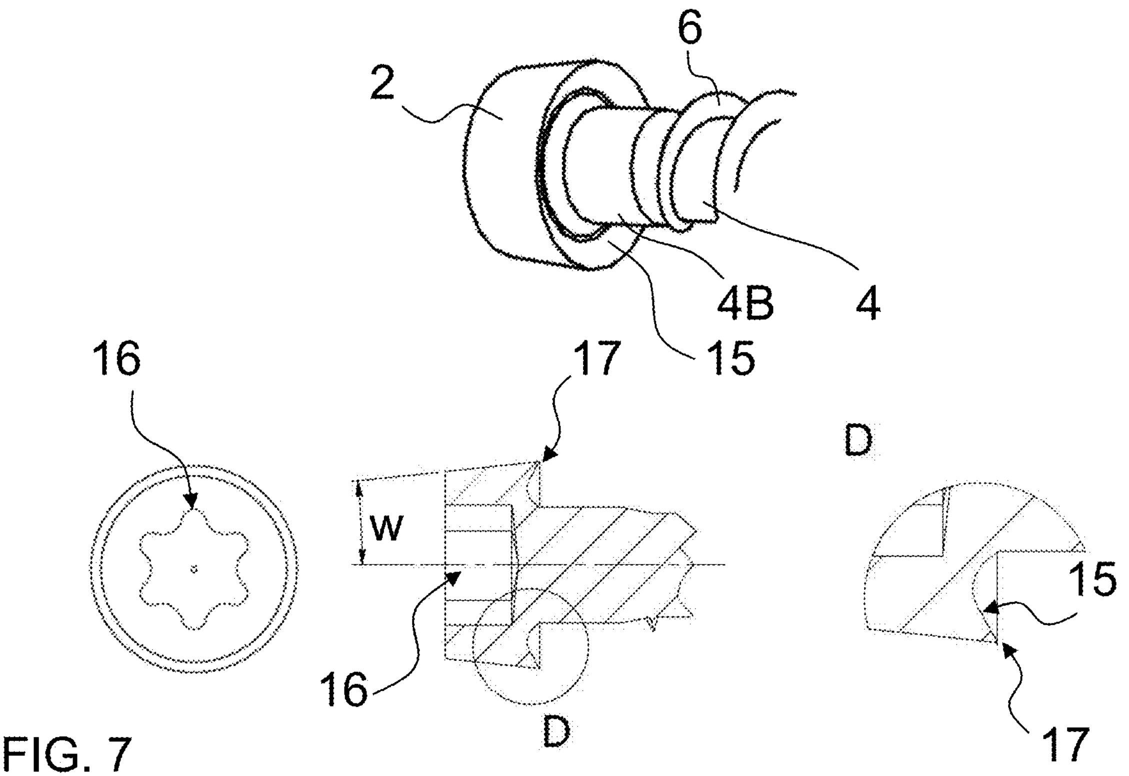
FIG. 7 shows an enlarged drawing of a screw head.

FIG. 7 illustrates the head 2 of the screw 1, which comprises a recess 16 for receiving a tool, typically a tool marketed under the trade name Torx®. The underside of the head 2 comprises a sharp edge 17 at the end of a conical surface 15. The sharp edge 17 around the rim of the head 2 at the underside of the head 2 facilitates the countersinking of the screw head 2. Due to the reverse thread 6, the hole in the panel just below the head 2 would become wider than the stem 4 when the screw is driven through the panel so that material of the panel as cut by the edge 17 into chips and then pressed into the hole by head during countersinking would accumulate in the volume around the stem 4 just below the head 2.

Figure 8:
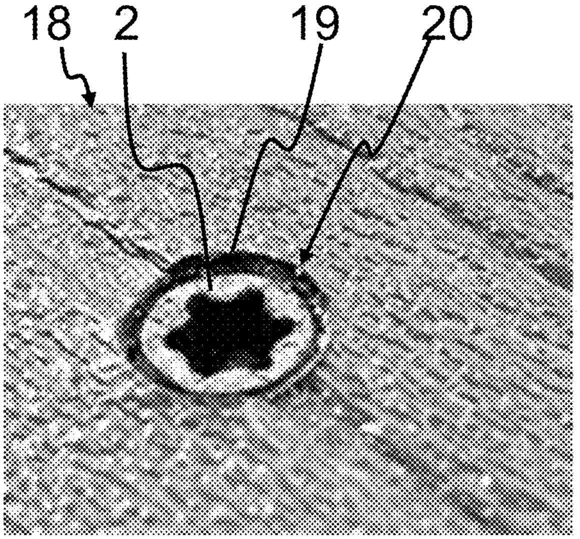
FIG. 8 is a photo of a screw countersunk inside a workpiece.
Figure 9:
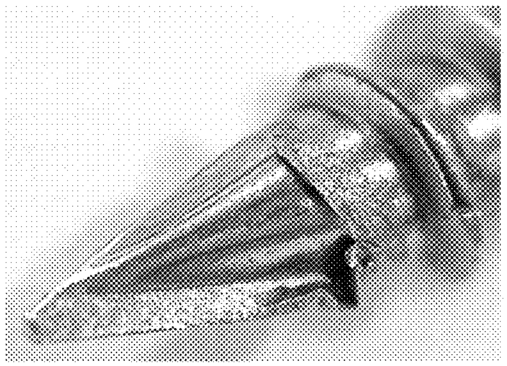
FIG. 9 is a photo of a tip of a screw used in FIG. 8.

An example of a screw head 2 according to the invention countersunk in a WPC panel 18 is shown in the photo of FIG. 8. It is observed that the rim 19 of the hole 20 is cut clean so that no chips or fringes extend out of the hole 20. FIG. 9 is a photo of a tip of a produced screw used in FIG. 8.

In the exemplified screw, dimensions were as follows mm:

Length of screw: 70 mm
Length of first thread: 50 mm
Length of second thread 15 mm
Stem diameter at first thread: 3 mm
Outer diameter of first thread: 5 mm
Outer diameter of second thread: 5.3 mm
Stem diameter between second thread and head: 4 mm
Pitch of second thread: 2.5 mm
Diameter of head: 7 mm
Length of drill point: 5 mm
Distance of tip from central axis: 0.4 (27% of stem radius R)
Angle w of head: 6 degrees
Angles between central axis and cutting edge: 11 degrees However, the dimensions can be varied according to the needs, for example with in the following ranges:

Length of screw: 20-150 mm
Length of first thread: 10-90 mm
Length of second thread: 3-40 mm
Stem diameter at first thread: 2-6 mm
Outer diameter of first thread: 3-8 mm
Outer diameter of second thread: 3.5-10 mm
Stem diameter between second thread and head: 2-8 mm
Pitch of first thread: 0.8-6 mm
Pitch of second thread: 1-6 mm
Diameter of head: 4-15 mm
Length of drill point: 3-10 mm
Angle w of head: 0-25 degrees
Angles between central axis and cutting edge: 0-60 degrees
Eccentric distance of tip from central axis: 10-100% of stem Radius, however, typically
10-95% of R due to rounded tip.

REFERENCE NUMBERS

1 screw
2 screw head
3 drill point
4 stem
4A transition between stem 4 and drill point 3
4B region of stem 4 without thread underneath the screw head 2
5 first thread
6 second thread
7 tip of drill point 3
8 central axis
9 convex surface, e.g. shaped as part of oblique circular cone
10 cutting edge
11 cutting face
12 second edge
13 second face, for example convex transition surface
13A edge between cutting face 11 and second surface 13
14 slot between edges 10 and 12
15 conical surface on underside of screw head 2
16 recess for tool in screw head 2
17 sharp edge around rim at the underside of the screw head 2
18 WPC panel
19 rim of hole 20 in WPC panel 18
20 hole in WPC panel 18

The invention claimed is:

1. A screw (1) for drilling and screwing through a workpiece (18) of a plastic or wood plastic composite, wherein the screw (1) has a central longitudinal axis (8) and comprises a stem (4) with a screw head (2) at a first end and a drill point (3) at an opposite second end and a first thread (5) around the stem (4), wherein the first thread (5) is adjacent to the drill point (3) and configured for screwing into and through the workpiece (18) after pre-drilling with the drill point (3), wherein the drill point (3) comprises a foremost tip (7) for initial workpiece (18) contact during start of drilling and screwing into the workpiece (18), wherein the tip (7) is eccentrically displaced from the central axis (8), wherein the drill point (3) comprises a cutting edge (10) extending from the tip (7) to the stem (4) and a cutting face (11) extending from the cutting edge (10) inwards towards an inner part of the drill point (3) and forming a first side of a slot (14) in the drill point (3), the cutting face (11) being configured for working the workpiece (18) during drilling and screwing of the screw (1) in the workpiece (18), a convex curved outer surface (9) tapering along the drill point (3) from the stem (4) to the tip (7) and extending over an angle of no less than 225 degrees and no more than 330 degrees about the central axis (8) as measured from the cutting edge (10), a second face (13) extending from the curved outer surface (9) inwards and to the cutting face (11) and forming a second side of the slot (14);

wherein the cutting face (11) is planar and parallel to the central axis and extends laterally from the cutting edge (10) radially inwards towards the central axis (8) and to the central axis so as to follow a plane that contains the central axis (8).

2. A screw according to claim 1, wherein the drill point (3) comprises only a single tip (7) and a single cutting face (11).

3. A screw according to claim 1, wherein the convex surface (9) tapering from the stem (4) to the tip (7) is formed as a part of an oblique circular cone ending at the tip.

4. A screw according to claim 1, wherein the cutting edge (10) extends to the central axis (12) but does not cross the central axis (12) and does not extend to the opposite side of the central axis (12).

5. A screw according to claim 1, wherein the second face (13) is smoothly convex.

6. A screw according to claim 1, wherein the stem (4) is cylindrical with a circular cross section and wherein the first thread (5) is circular when projected onto a plane perpendicular to the central axis (8).

7. A screw according to claim 1, wherein the tapering convex curved outer surface (9) extends over an angle W in the range of 240 to 315 degrees and the slot (14) extends over an angle of 360−W.

8. A screw according to claim 1, wherein the screw (1) comprises a second thread (6) between the first thread (5) and the screw head (2), the second thread (6) having a helical direction opposite to the first thread (5) and is configured for pulling material from the drilled hole deeper into the workpiece (18) during screwing of the screw (1) through the workpiece (18).

9. A screw according to claim 8, wherein the second thread (6) has an outer diameter larger than the outer diameter of the first thread (5).

10. A screw according to claim 8, wherein the stem (4) comprises a region (4B) without thread between the head (2) and the second thread (6), the region (4B) having a diameter smaller than the outer diameter of the second thread (6) and a length not less than at least one of a pitch of the second thread (6) and the height of the screw head (2).

11. A screw according to claim 1, wherein the convex surface (9) tapering from the stem (4) to the tip (7) is formed as a part of an oblique circular cone, wherein the tapering convex curved outer surface (9) extends over an angle W in the range of 240 to 315 degrees and the slot (14) extends over an angle of 360−W; wherein the drill point (3) comprises only a single tip (7) and a single cutting face (11), wherein the second face (13) is smoothly convex, wherein the stem (4) is cylindrical with a circular cross section, wherein the screw (1) comprises a second thread (6) between the first thread (5) and the screw head (2), the second thread (6) having a helical direction opposite to the first thread (5) and is configured for pulling material from the drilled hole deeper into the workpiece (18) during screwing of the screw (1) through the workpiece (18), wherein the second thread (6) has an outer diameter larger than the outer diameter of the first thread (5).

12. A method of fastening a workpiece in the form of a panel made of plastic or a wood-plastic composite onto a wooden support structure, in particular for providing an outdoor deck on a terrace or balcony, comprising providing a screw according to claim 1, and fastening the workpiece to the support structure with the screw.

13. A method of fastening a workpiece (18) made of wood plastic composite on an underlying wooden support, the method comprising providing a support structure made of wood, placing the workpiece (18) against the support structure, providing a screw (1) according to claim 1 with a length larger than the thickness of the workpiece (18);

drilling the screw (1) through the workpiece (18);

screwing the screw (1) with a portion of the first thread (5) into the underlying wood structure;

fastening the workpiece (18) onto the underlying support structure by the first thread (5), and advancing the screw (1) by rotation, until the screw head (2) is countersunk in the workpiece (18).

14. A method according to claim 13, wherein the screw (1) comprises a second thread (6) between the first thread (5) and the screw head (2), the second thread (6) having a helical direction opposite to the first thread (5) and wherein the method comprises pulling material from the drilled hole by the second thread deeper into the workpiece (18) during advancing of the screw (1) through the workpiece (18).

15. A method of decking a terrace or balcony by workpieces which are plastic composite panels (18) that contain a reinforcing material in a plastic matrix, for example wood plastic composite panels, or which are plastic panels without containing reinforcing material, the method comprising providing an underlying support structure made of wood, placing the panel (18) on top of the support structure, providing a screw (1) according to claim 1 with a length larger than the thickness of the panel (18);

drilling the screw (1) through the panel (18);

screwing the screw (1) with a portion of the first thread (5) into the underlying wood structure;

fastening the panel (18) onto the underlying support structure by the first thread (5), and continuing advancing the screw (1) by rotation, until the screw head (2) is countersunk in the panel (18).

16. A method according to claim 15, wherein the screw (1) comprises a second thread (6) between the first thread (5) and the screw head (2), the second thread (6) having a helical direction opposite to the first thread (5) and wherein the method comprises pulling material from the drilled hole by the second thread deeper into the panel (18) during advancing of the screw (1) through the panel (18).

* * * * *